US012632540B2

(12) United States Patent
Liu et al.

(10) Patent No.: US 12,632,540 B2
(45) Date of Patent: May 19, 2026

(54) SECURITY DEFENDING METHOD AND ELECTRONIC APPARATUS

(71) Applicant: Beijing ESWIN Computing Technology Co., Ltd., Beijing (CN)

(72) Inventors: Baoguang Liu, Beijing (CN); Dan Liu, Beijing (CN); Liu Cao, Beijing (CN); Lele Ma, Beijing (CN); Wenjuan Zhang, Beijing (CN); Xun Zhang, Beijing (CN); Xianshuai Yang, Beijing (CN); Bin Liu, Beijing (CN); Xinyu Qin, Beijing (CN); Yifan Liu, Beijing (CN); Kaixuan Wang, Beijing (CN); Jun Han, Beijing (CN)

(73) Assignee: Beijing ESWIN Computing Technology Co., Ltd., Beijing (CN)

( * ) Notice: Subject to any disclaimer, the term of this patent is extended or adjusted under 35 U.S.C. 154(b) by 494 days.

(21) Appl. No.: 18/147,882

(22) Filed: Dec. 29, 2022

(65) Prior Publication Data

US 2024/0070263 A1   Feb. 29, 2024

(30) Foreign Application Priority Data

Aug. 24, 2022   (CN) .......................... 202211029408.2

(51) Int. Cl.
*G06F 21/54* (2013.01)
*G06F 21/51* (2013.01)
*G06F 21/60* (2013.01)

(52) U.S. Cl.
CPC .............. *G06F 21/54* (2013.01); *G06F 21/51* (2013.01); *G06F 21/602* (2013.01)

(58) Field of Classification Search
CPC .......... G06F 21/51; G06F 21/52; G06F 21/54; G06F 21/602; G06F 9/4812
See application file for complete search history.

(56) References Cited

U.S. PATENT DOCUMENTS 5,872,987 A * 2/1999 Wade ...................... G06F 21/52
712/3
11,537,715 B2 * 12/2022 Porteboeuf ............. G06F 11/28
(Continued)

*Primary Examiner* — Alexander Lagor
*Assistant Examiner* — Taylor P Vu
(74) *Attorney, Agent, or Firm* — LEASON ELLIS LLP

(57) ABSTRACT

A security defending method and an electronic apparatus are disclosed. The security defending method is applicable in a coprocessor, including: receiving a jump destination encryption request for the operation task; using mask configuration to perform first mask processing on the first jump destination address value to obtain a first intermediate jump destination address value; performing an authentication operation based on the first jump destination storage address, a key reference value corresponding to the operation task and the first intermediate jump destination address value, to obtain a first encryption result value; using the mask configuration to perform second mask processing on the first encryption result value to obtain a first intermediate encryption result value; performing an authentication operation on the first intermediate encryption result value and the first jump destination address value to obtain a first encryption jump destination address value. The security defending method can prevent buffer overflow attacks.

14 Claims, 5 Drawing Sheets

<u>10</u>

(56)        References Cited

U.S. PATENT DOCUMENTS

| | | | | |
|---|---|---|---|---|
| 11,853,413 | B2* | 12/2023 | Bhat | G06F 21/54 |
| 2004/0008711 | A1* | 1/2004 | Lahti | H04L 63/0485 |
| | | | | 370/428 |
| 2016/0110545 | A1* | 4/2016 | Acar | G06F 21/52 |
| | | | | 726/23 |
| 2018/0089422 | A1* | 3/2018 | Kounavis | G06F 21/54 |
| 2019/0130120 | A1* | 5/2019 | Lal | G06F 21/64 |
| 2020/0082066 | A1* | 3/2020 | Semeria | G06F 21/125 |
| 2020/0401093 | A1* | 12/2020 | Song | G06F 16/2471 |
| 2021/0004456 | A1* | 1/2021 | Savry | G06F 9/24 |
| 2021/0096872 | A1* | 4/2021 | LeMay | G06F 21/52 |
| 2021/0124825 | A1* | 4/2021 | Dabak | G06F 21/606 |
| 2022/0343029 | A1* | 10/2022 | Sultana | G06F 21/71 |

* cited by examiner

| Operation code (opcode) | Source register (rs1/rs2) | Destination register (rd) | Register occupation state (xs1/xs2/xd) |
|---|---|---|---|
FIG. 2A
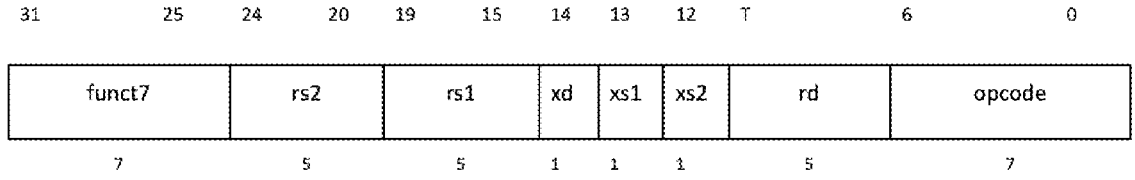
FIG. 2B
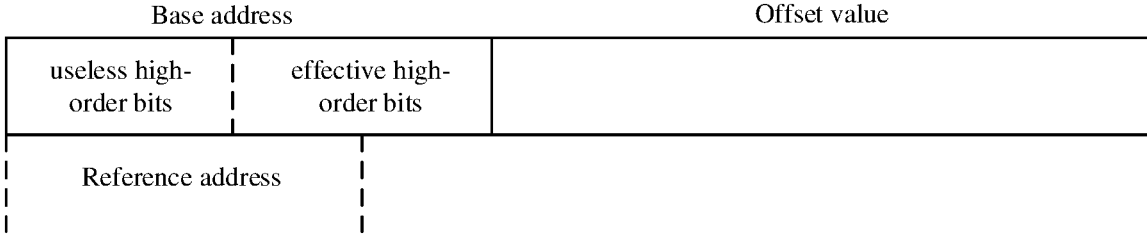
FIG. 3

1000

SECURITY DEFENDING METHOD AND ELECTRONIC APPARATUS

CROSS REFERENCE

The application claims priority to Chinese patent application No. 202211029408.2, filed on Aug. 24, 2022, the entire disclosure of which is incorporated herein by reference as part of the present application.

TECHNICAL FIELD

Embodiments of the present disclosure relate to a security defending method and an electronic apparatus.

BACKGROUND

In recent years, one of the most common vulnerabilities affecting computer system security is buffer overflow attack. A successful buffer overflow attack may modify an operation control flow of the computer system, for example, may modify a return address of a program, EBP for calling functions, or modify a function pointer, a GOT table, etc., so as to lead the program to an attacker's preset attack program, to execute malicious codes and cause collapse of the entire program, or let the attacker gain control of a portion of the system, causing security crisis of the entire computer system. Therefore, it is of great practical significance to defend against buffer overflow attacks.

Generally speaking, buffer overflow attacks may be divided into two modes: (I) directly tampering with key data for running programs such as EIP; and (II) indirectly tampering with key data such as EBP and EIP by modifying pointer variables, etc., through buffer overflow.

In order to mitigate threats of memory security violations, some technologies are proposed. These technologies, such as the ASLR mechanism, increase difficulties for an attacker to jump to a specific memory location, by adding a random offset to a starting address of stack, heap and other memory segments where key data is stored, when initializing an address space of the program. Another example is the DEP mechanism, which implements the W⊕X principle of address, that is, a writable address is not executable, and an executable address is not writable. The DEP mechanism prevents an attacker from executing an injected malicious program segment by setting an address space of the data segment as non-executable through a flag bit, once the system fetches instructions from these address spaces, a CPU will report a memory violation exception, thereby killing the process. A stack space is also set to have a non-executable attribute by an operating system, so ordinary shellcode injection cannot be executed.

The above-mentioned two prevention mechanisms well protect running of programs in the computer system to a certain extent, but fail to operate well for more complex attacks. For example, with respect to protection with the ASLR mechanism, randomization is only randomizing a loading address of a library function each time, but a relative address between library functions remains unchanged, so an attacker may leak the address of the library function through the GOT table, to derive an address of other function in the running program; for example, with respect to the DEP mechanism, the protection attacker may use a dynamic link library or a code segment that already exists in the program to construct a return address and data in the stack to implement Ret2libc attack.

Later, Stack Canary was proposed as a more effective prevention mechanism. In the Stack Canary mechanism, a Canary Word may be inserted between a buffer and a return address. In a case where the buffer is overflowed, the Canary Word will be overwritten before the return address is overwritten. By checking whether a value of Canary Word has been modified, it may be judged whether an overflow attack has occurred. However, if the Canary Word value is inserted at the tail of the buffer, there will be some system functions allowing the Canary Word value to be written, so that an overflow attack is still feasible.

SUMMARY

Embodiments of the present disclosure provide a security defending method and an electronic apparatus for the above-mentioned buffer overflow attack.

At least one embodiment of the present disclosure provides a security defending method of an operation task, used in a main processor running the operation task, comprising: sending a mask configuration instruction to the coprocessor, to save mask configuration in a mask register of the coprocessor, wherein the mask configuration is used for the coprocessor to perform mask processing on a received destination address value in an encryption procedure or an authentication procedure; sending a reference address configuration instruction corresponding to the operation task to the coprocessor, so as to save a reference address in a reference address register of the coprocessor, wherein the reference address is used for the coprocessor to perform an authentication operation in the authentication procedure.

At least one embodiment of the present disclosure provides an electronic apparatus, comprising a main processor, a coprocessor in communication with the main processor, and a memory, wherein the memory stores a computer executable code, and the computer executable code, when executed by the main processor and the coprocessor, is configured to implement the above-mentioned security defending method.

BRIEF DESCRIPTION OF THE DRAWINGS

In order to clearly illustrate the technical solution of the embodiments of the present disclosure, the drawings of the embodiments will be briefly described. It is obvious that the described drawings in the following are only related to some embodiments of the present disclosure and thus are not limitative of the present disclosure.

FIG. 2A shows a schematic diagram of at least some formats of an operation instruction according to at least one embodiment of the present disclosure.

FIG. 2B shows a schematic diagram of an example of an operation instruction according to at least one embodiment of the present disclosure.

FIG. 3 shows an example in which a reference address includes useless high-order bits and some effective high-order bits of a base address according to at least one embodiment of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

In order to make the following description of the embodiments of the present disclosure clear and concise, the present disclosure omits a detailed description of some well-known functions and well-known components.

At least one embodiment of the present disclosure provides a security defending method and a processing apparatus as well as a coprocessor included in the processing apparatus for co-processing computer buffer overflow security issues with hardware, which can mitigate threats of computer buffer overflow. As compared with the pointer encryption design in the form of software, the security defending method and the processing apparatus, through encryption and authentication (decryption) aided by the coprocessor, can effectively avoid decrease of system operation efficiency, without generating additional memory overhead, so that system performance loss is not obvious while security is greatly improved, which can efficiently solve the security defense problem of computer buffer overflow.

Figure 1:
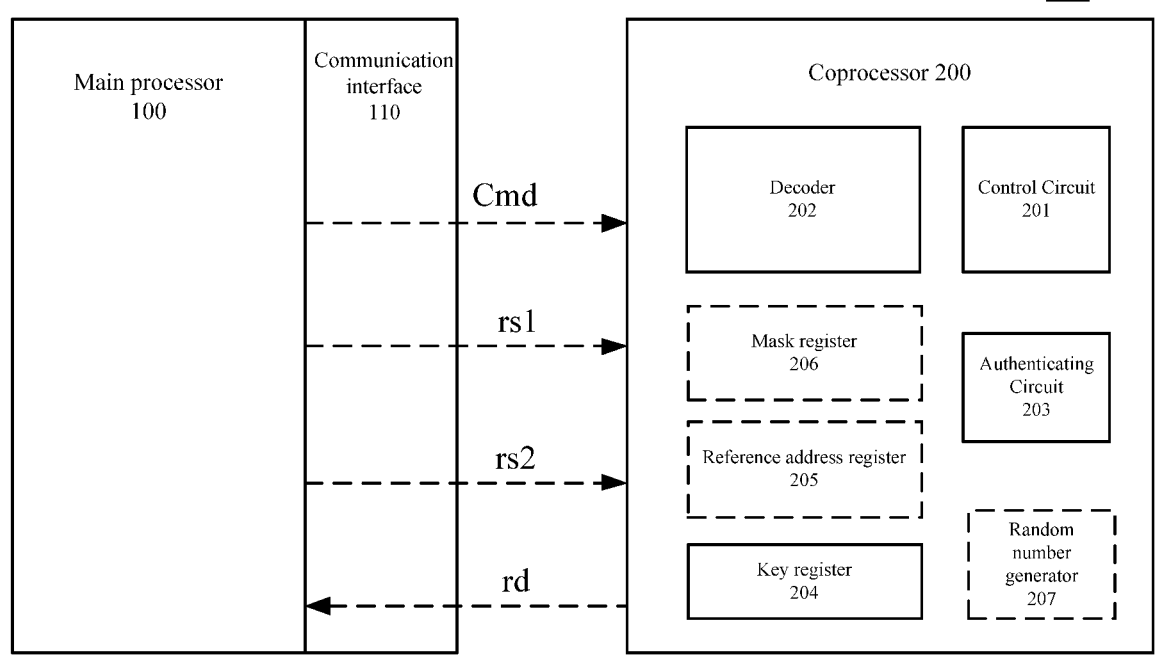
FIG. 1 shows a schematic diagram of a processing apparatus and a coprocessor provided by at least one embodiment of the present disclosure.

FIG. 1 shows a processing apparatus and a coprocessor included in the processing apparatus provided by at least one implementation of the present disclosure. As shown in FIG. 1, the processing apparatus 10 includes one or more main processors (or main processor cores) 100 and one or more coprocessors (or coprocessor cores) 200. The main processor 100 includes a communication interface 110 and communicates with the coprocessor 200 through the communication interface 110. The main processor 100 is configured to run at least one computer program to obtain a process corresponding to the computer program, for example, the process may include a plurality of parallel threads. In a procedure of running the computer program, the process or one of the threads of the process may send an operation instruction to the coprocessor 200 to configure the coprocessor 200, or call the coprocessor 200 to implement a security defense function. The computer program includes a system program and/or an application program, and the system program, for example, is an operating system. The processing apparatus can efficiently solve the security defense problem of computer buffer overflow through coprocessor aided encryption and decryption.

In the present disclosure, an "operation task" is used to refer to a process or a thread. Here, the process is used to describe an execution procedure of a computer program. The operating system allocates an independent address space and other resources for each process. A thread is subordinate to a process and is executed in an address space of the process. In the operating system, a plurality of processes may be executed alternately in parallel. Create and maintain a Process Control Block (PCB) for each process, which is used to describe a current situation of the process and information that controls running of the process. A plurality of threads can be executed alternately in parallel for a same process. Create and maintain a Thread Control Block (TCB) for each thread, which is used to describe a current situation of the thread and information that controls running of the process. Information about resource allocation of these threads has been recorded in the PCB of the corresponding process they are subordinate to (i.e., the PCB of the threads is the same as that of the process they are subordinate to), so that content of the TCB is less than content of the corresponding PCB. In the embodiment of the present disclosure, there is a case of executing instruction sequence jump or a case of using a function pointer during a running procedure of the process or the thread.

As shown in FIG. 1, in at least one embodiment, the coprocessor 200 configured for security defense of an operation task includes a control circuit 201, a decoder 202, an authenticating circuit 203, and a key register 204.

The control circuit 201, in the coprocessor 200, sends out various operation control signals, according to an operation required to be completed as indicated by an operation instruction, to control a controlled object to complete execution of the instruction. The control circuit 201 is in communication with other components, to supply an operation control signal.

The decoder 202 is configured to parse the operation instruction received by the coprocessor 200 and determine what the operation code of the operation instruction is to determine nature and method of the operation, so that the control circuit 201 may send out various operation control signals (according to certain timing).

For example, the authenticating circuit 203 may adopt an encryption algorithm or an authentication algorithm, for example, a symmetric encryption algorithm or a Message Authentication Code (MAC) algorithm, etc. for an encryption operation and an authentication operation. A sender and a receiver adopt a same key and a same algorithm, to calculate a received message to be encrypted, and compare calculation results for authentication.

When the authenticating circuit 203 is configured to adopt the encryption algorithm, perform an encryption calculation on the received message to be encrypted (plaintext) to obtain encrypted information (ciphertext). For example, an authenticating circuit 203 is configured to perform an encryption calculation on the message to be encrypted (plaintext) according to the key and the message to be encrypted (plaintext) received, to obtain the encrypted information (ciphertext), and the ciphertext obtained may be used for subsequent decryption or authentication operation. For example, in the embodiment of the present disclosure, the message to be encrypted is a jump destination address value.

For example, the authenticating circuit may adopt a symmetric encryption algorithm, for example, a Data Encryption Standard (DES) encryption algorithm, that is, for example, the authenticating circuit may be a DES encrypting circuit. The DES encryption algorithm is symmetric and uses a same key to encrypt and decrypt data. The DES encrypting circuit uses a same key for encryption and decryption, takes a 64-bit plaintext as a basic block for block encryption in a mode of block encrypting, and finally, splices the generated data bit by bit to form a final ciphertext. A size of a DES block is, for example, 64 bits. If an encrypted data length is not a multiple of 64 bits, bits may be filled according to some specific rules.

For example, when the authenticating circuit 203 is configured to use the authentication algorithm, the received message to be encrypted (the original message) is calculated with the key by using the Message Authentication Code (MAC) algorithm to generate a MAC value, and in this case, the authenticating circuit 203 may be a message authentication code circuit. For example, the MAC value obtained is transmitted together with the original message, and the receiver generates a MAC value again with the same key by using the same algorithm, and then performs comparison. Once the two MAC values are identical, it indicates that the MAC authentication is correct, otherwise, the authentication fails. For example, the MAC algorithm may be a Hash-based Message Authentication Code (HMAC) algorithm, which uses a Hash algorithm as an encryption primitive.

The key register 204 is configured to save a key reference value, and supply the key reference value for generating the key required by the authenticating circuit in the encryption procedure or the authentication procedure. The key reference value is, for example, a random number, which may be, for example, obtained from a side of the main processor 100, or generated locally within the coprocessor 200. In an example that the key reference value is generated locally within the coprocessor 200, as shown in FIG. 1, the coprocessor 200 may further include a random number generator 207. The random number generator 207 is configured to generate a random number, for example, various available algorithms or principles may be used for generating the required random number. The number of bits of the obtained random number may be 64, 128, etc., which will not be limited in the embodiments of the present disclosure.

As described below, the key reference value for identifying the process is in one-to-one correspondence to the process running on the main processor (e.g., it is bound to a program). For example, the key reference value corresponding to a program is randomly allocated each time the program is loaded into the system and run as a process, for example, the key reference value is saved in the PCB of the process.

In at least another embodiment, the coprocessor 200 may further include a reference address register 205. The reference address register 205 is configured to store a reference address corresponding to the operation task, and the reference address is configured to recover a return destination address in the decryption authentication stage (referring description below for details).

In at least another embodiment, the coprocessor 200 may further include a mask register 206. The mask register 206 is configured to store mask configuration. The mask configuration, for example, is a binary value including a plurality of bits, which corresponds to a certain mode (which may be referred to as "a first mode" here), for example, a bit of 1 in the binary value of the mask configuration represents and the corresponding bit in the processed binary value will be reserved, accordingly, a bit of 0 in the binary value of the mask configuration represents and the corresponding bit in the processed binary value will be zeroed, and a corresponding mask operation is, for example, an AND operation. For example, if the mask configuration is 10100000 of 8 bits and the processed binary value is also 8 bits, then after a mask operation is performed by using the mask configuration, a 7th bit and a 5th bit of the processed binary value will be reserved and the rest bits will be zeroed. For another example, if the mask configuration is FF000000 of 32 bits and the processed binary value is also 32 bits, then after a mask operation is performed by using the mask configuration, high-order 8 bits of the processed binary value will be reserved and the rest of the bits will be zeroed.

For example, the values of the mask register 206 and the reference address register 205 may be modified only through MSET and BSET instructions related to data operations.

The communication interface 110 is configured to handle communication between the main processor 100 and the coprocessor 200. The communication interface 110 may be, for example, an apparatus or module independent of the main processor 100 and the coprocessor 200, and respectively in communication with the main processor 100 and the coprocessor 200; or, the communication interface 110 may be, for example, a portion of the main processor 100, and in communication with other components or parts including the coprocessor 200 within the processing apparatus 10. The communication interface 110, for example, may be constructed according to a certain communication protocol, for example, may include one or more buffers, to buffer one or more types of messages transmitted.

In addition to the conventional value taking unit, decoding unit, executing unit, buffer of at least one level, Memory Management Unit (MMU), etc., the main processor further maintains a Process Control Block (PCB) corresponding to a process of a program in a running procedure of the program. The PCB is the only sign of existence of the corresponding process. The system controls and schedules the process through the PCB.

During an operation procedure, a program (process) running on the main processor 100 operates the coprocessor 200 through at least one operation instruction. FIG. 2A shows a schematic diagram of at least some formats of an operation instruction according to at least one embodiment of the present disclosure. As shown in FIG. 2A, the operation instruction may include fields/bits below:

Operation code (opcode) field, indicating an operation to be performed by the instruction;

Destination register (rd) field;

Source register (rs) field, which may include one or more source registers as required, for example, a first source register (rs1) or a second source register (rs2);

Register occupation state field, including a plurality of bits, respectively corresponding to the destination register and the source register (one or more). For example, in a case where the foregoing registers rs1, rs2 and rd are available at a same time, the register occupation state field respectively includes three bits: xs1, xs2 and xd, where the bit xs1 represents whether to occupy the first source register, the bit xs2 represents whether to occupy the second source register, and the bit xd represents whether to occupy the destination register, etc.

Sizes and sequences, etc. of the respective fields in the operation instruction may be correspondingly changed according to different instruction sets, which will not be limited in the embodiments of the present disclosure.

In at least one embodiment of the present disclosure, for example, exemplary six operation instructions below are defined according to the above-mentioned format, so that the coprocessor may be controlled to complete the security defense operation, for solving the security defense problem of computer buffer overflow.

As shown in FIG. 1, the main processor 100 sends an operation instruction (cmd) to the coprocessor 200 through the communication interface 110, and sends a value of a related register (the source register rs1 and/or the source register rs2) to the coprocessor 200, according to the operation instruction sent to the coprocessor 200; the coprocessor 200 returns an operation result (including a register number and a return value of the destination register rd) to the main processor 100 through the communication interface 110. For example, the communication interface 110 may also mark a state of the coprocessor 200 (e.g., busy, idle, etc.), and the main processor 100 may read the state; for another example, the communication interface 110 may also have functions such as accessing the memory on the side of the main processor 100, causing interrupts, etc., as required.

For example, a "jump destination storage address" as described below may be a storage address of a current program address (a value of a program counter) saved before jump when the program calls a function, while a "jump destination address value" is an address value (i.e., the value of the program counter) stored in the storage address; for another example, the "jump destination storage address" may be a storage address (i.e. a pointer address) of a function pointer value when the program creates the function pointer, while the "jump destination address value" is an address value (i.e. a pointer value) stored in the storage address.

These operation instructions include:

Instruction 0 (INSTRUCTION_0): a key reference value loading instruction. For example, when a corresponding process starts to operate or when the process cuts in, the instruction is used to instruct the coprocessor to load the value (the key reference value) stored in the first source register specified in the rs1 field of the instruction into the key register of the coprocessor, or the instruction is used to instruct the coprocessor to generate a key reference value and store the key reference value in the key register of the coprocessor. For example, before executing the instruction 0, on the main processor side, the key reference value is copied from the Process Control Block (PCB, Process Control Block) corresponding to the process to the first source register.

Instruction 1 (INSTRUCTION_1): a key reference value storage instruction. For example, when the process corresponding to the program cuts out or ends, the instruction is used to instruct the coprocessor to take out the key reference value stored in the key register and store the key reference value in the destination register specified in the rd field of the instruction, and thus, for example, the key reference value may be further stored in the Process Control Block (PCB)

corresponding to the operation task (e.g., the process or the thread) on the main processor, and securely saved together with other crucial information of the program.

The key reference value is in one-to-one correspondence with the program, and for example, a key reference value stored in the key register of the coprocessor at each moment is unique, so that use of the key reference value may further improve security.

Instruction 2 (INSTRUCTION_2): a mask configuration instruction. For example, when a process corresponding to the program starts to operate, the instruction is used to instruct the coprocessor to load the value stored in the first source register specified in the rs1 field of the instruction into the mask register, to supply mask configuration. The mask configuration is used to indicate which bits in the input jump destination address value will be taken as an authentication value storage location according to a certain mode (the first mode). For example, the first mode specifies that high-order m bits in the jump destination address value (the address value) are used for storing the authentication value, or n bits (e.g., odd bits or even bits) selected in the high-order m bits are used for storing the authentication value.

In some embodiments, the mask configuration is, for example, fixed in the coprocessor, at this time, for example, the coprocessor may not include a mask register, and accordingly, the mask configuration instruction is not required.

Instruction 3 (INSTRUCTION_3): a reference address configuration instruction. For example, during an operation procedure of the process corresponding to the program, for example, when the process starts to operate, the instruction is used to instruct the coprocessor to load the value (the reference address value) stored in the first source register specified in the rs1 field of the instruction into the reference address register of the coprocessor, for recovering the jump destination address value (the address value) after authentication. For example, before instruction 3 is executed, on the main processor side, the reference address value is copied from the Process Control Block (PCB) corresponding to the process to the first source register.

For example, reference addresses used in different programs are different from each other. For example, the reference address may be a base address of a virtual address or a base address of a physical address of an address space allocated for the corresponding program (process) in the operating system, or a portion of the base address (e.g., some of the high-order bits of the base address). Each virtual address in the computer system includes a virtual base address and an offset value; similarly, each physical address includes a physical base address and an offset value. Usually, the operating system allocates different address spaces for different processes without overlapping with each other, so base addresses of different processes are different from each other. On the other hand, a plurality of threads subordinate to a same process may have a same base address.

In at least some embodiments of the present disclosure, the mask configuration and the reference address are used cooperatively with each other. For example, the mask configuration is used to handle only a portion (some bits) that corresponds to the reference address of the address. For example, the mask configuration is used to extract the base address portion of the address (i.e., the offset value portion is zeroed while the base address portion remains unchanged), or remove the base address portion (i.e., the base address portion is zeroed while the offset value portion remains unchanged).

For example, in a 64-bit architecture, a bit width is 64 bits, but a virtual address in the computer system usually does not use all the 64 bits; for example, a virtual address in a RISC-V instruction set usually uses three paging modes: sv32, sv39, and sv48 at present. Therefore, there are useless bits in high-order bits of the base address in the virtual address of the system (e.g., these ignore bits are all 0). Therefore, in at least one embodiment of the present disclosure, an authentication value (an authentication code) may be stored only using these useless high-order bits in the base address, or the authentication value (the authentication code) may also be stored using effective high-order bits of a portion of a base address value; in the example of only using these useless high-order bits, since significant bits of the base address value are not modified, there is no need to consider the corresponding base address value used for recovering the jump destination address value. For another example, in a 32-bit architecture, a bit width is 32 bits, and in this case, the system mostly uses a physical address. Some useless high-order bits may still exist in the base address of the physical address since usually a system memory (or an address space allocated to the process) is relatively small (e.g., less than 4G, for example, IG); on the other hand, with respect to the program, effective high-order bits of the base address value usually remain unchanged within the allocated address space of the program. For example, in a case where a 4-level page table is used, a 0-level page table and a 1-level page table may usually remain unchanged in a running procedure of the program. Therefore, in at least one embodiment of the present disclosure, an authentication value (an authentication code) is stored using the useless high-order bits and some or all of the effective high-order bits of the base address, and in this case, the corresponding base address value used for recovering the destination address value needs to be considered. The base address value is maintained by the system (software) running on the main processor.

FIG. 3 shows an example in which a reference address includes useless high-order bits and some effective high-order bits of a base address.

Instruction 4 (INSTRUMENT_4): jump destination encryption instruction. A value stored in the first source register specified in the rs1 field of the instruction is a jump destination address value, for example, a pointer to be encrypted; a value stored in the second source register specified in the rs2 field of the instruction is a jump destination storage address, for example, a pointer address; the destination register specified in the rd field of the instruction is configured to store an encryption jump destination address value output.

Specifically, for the value stored in the first source register specified in the rs1 field of the instruction (the jump destination address value, for example, the pointer to be encrypted), some bits that are indicated by a predetermined mode (e.g., referred to as "the first mode") are removed according to the mask configuration, to obtain a first intermediate value; perform an authentication operation based on the first jump destination storage address, a key reference value corresponding to the operation task, and the first intermediate jump destination address value, to obtain a first encryption result value; for the obtained encryption result, after remaining the some bits that are indicated by the above-mentioned predetermined mode according to the mask configuration, perform an authentication operation (e.g., an XOR operation) on the obtained encryption result with the jump destination address value to obtain an encryption jump destination address value (e.g., an encrypted pointer); and then the encryption jump destination address value is output to the destination register specified in the rd field of the instruction.

For example, in one example, in the operation procedure of the process or the thread corresponding to the program, the above-mentioned instruction is used to instruct the coprocessor to perform an operation (e.g., an XOR operation) on the value stored in the second source register specified in the rs2 field of the instruction (the jump destination storage address, for example, the pointer address) with the key reference value in the key register, to obtain a key; and the first intermediate value, for example, as a plaintext, is input into the authenticating circuit together with the above-mentioned key for the authentication operation, so as to obtain an encryption result value.

For example, in another example, in the operation procedure of the process or the thread, the above-described instruction is used to instruct the coprocessor to perform an operation (e.g., an XOR operation) on the value stored in the second source register specified in the rs2 field of the instruction (the jump destination storage address, for example, the pointer address) with the first intermediate value, to obtain a first intermediate calculation result value, to obtain a key from the key reference value in the key register; and the first intermediate calculation result value is input into the authenticating circuit as a plaintext together with the above-described key for the authentication operation, so as to obtain an encryption result value.

Instruction 5 (INSTRUCTION_5): a jump destination authentication instruction. A value stored in the second source register specified in the rs2 field of the instruction is the jump destination storage address, for example, the pointer address; a value stored in the first source register specified in the rs1 field of the instruction is the encryption jump destination address value, for example, the encrypted pointer; and the destination register specified in the rd field of the instruction is configured to store the output recovered jump destination address value.

Specifically, for the value stored in the first source register specified in the rs1 field of the instruction (the encryption jump destination address value, for example, the encrypted pointer), some bits that are indicated by a predetermined mode (e.g., the "first mode") are removed according to the mask configuration, to obtain the first intermediate value; perform an authentication operation based on the jump destination storage address, the key reference value corresponding to the current process or thread and the first intermediate value, to obtain an encryption result value; for the obtained encryption result, remain the bits that are indicated by the above-mentioned predetermined mode according to the mask configuration, to obtain a second intermediate value; perform an authentication operation (e.g., an XOR operation) on the second intermediate value with the reference address value in the reference address register, to obtain a third intermediate value for authenticating; if the third intermediate value is identical to an authentication value (a fourth intermediate value) included in the encryption jump destination address value, the authentication succeeds; if the authentication succeeds, the reference address value and the encryption jump destination address value may be used to obtain a recovered (or decrypted) jump destination address value; and the recovered jump destination address value is written into the destination register specified in the rd field of the instruction, otherwise, exception (alarm) is triggered, for example, exception information is fed back to the main processor. For the encryption jump destination address value, some bits that are indicated by the foregoing predetermined mode are reserved according to the mask configuration, to obtain the above-described fourth intermediate value.

For example, in one example, in the operation procedure of the process or the thread corresponding to the program, the above-mentioned instruction is used to instruct the coprocessor to perform an operation (e.g., an XOR operation) on the value stored in the second source register specified in the rs2 field of the instruction (the jump destination storage address, for example, the pointer address) with the key reference value in the key register, to obtain a key; the first intermediate value as, for example, a plaintext are input into the authenticating circuit together with the above-mentioned key for the authentication operation, so as to obtain an encryption result value.

For example, in another example, during a process or in an operation procedure of the process, the above-mentioned instruction is used to instruct the coprocessor to perform an operation (e.g., an XOR operation) on the value stored in the second source register specified in the rs2 field of the instruction (the jump destination storage address, for example, the pointer address) with the first intermediate value, to obtain a first intermediate calculation result value, to obtain a key from the key reference value in the key register; and the first intermediate calculation result value is input into the authenticating circuit as a plaintext together with the above-mentioned key for the authentication operation, so as to obtain an encryption result value.

When the coprocessor receives one of the above-mentioned operation instructions sent by the main processor, the decoder of the coprocessor decodes the received operation instruction, to determine operation content of the instruction. The control circuit generates a control signal according to the operation content obtained by decoding, to perform a required operation, for example, read a value from a certain register (e.g., the first source register or the second source register) of the main processor, store the read value in a certain processor in the coprocessor, or write the value in the coprocessor into a certain register (e.g., the destination register) in the main processor.

For example, specifications of the main processor 100, the coprocessor 200, and the communication interface 110 will not be limited in at least some embodiments of the present disclosure. For example, the main processor 100 and the coprocessor 200 may be based on instruction set architectures such as X86, MIPS, ARM, RISC-V, etc., while the communication interface 110 matches corresponding instruction sets or architectures.

For example, in one embodiment, the main processor 100 and the coprocessor 200 are based on the RISC-V instruction set architecture. For example, the main processor 100 may adopt a Rocket core, a Boom core (e.g., a SonicBoom core), a Freedom SOC core, etc.; for example, the communication interface 110 is a RoCC interface; for example, the communication protocol adopted by the RoCC interface is the DecoupledIO protocol defined by Constructing Hardware in a Scala Embedded Language (Chisel); and the DecoupledIO protocol is a FIFO-based protocol similar to the ready/valid protocol. Accordingly, in this embodiment, the adopted exemplary operation instructions are as shown in FIG. 2B. The exemplary operation instructions conform to format requirements of custom instructions in the RISC-V standard, with a total of 32 bits, having or including fields/bits below:

The opcode field, which indicates an operation code of the instruction;

The rd field, which indicates the destination register, and is located in the main processor;

The rs2 field, which indicates the second source register, and is located in the main processor;

The rs1 field, which indicates the first source register, and is located in the main processor;

The xs1 bit, which represents whether the coprocessor reads a value in the first source register;

The xs2 bit, which represents whether the coprocessor reads a value in the second source register;

The xd bit, which represents whether the coprocessor writes back to the destination register;

The funct7 field, which represents a 7-bit function code, and may be expanded by a user voluntarily to control the coprocessor to complete different operations.

Some embodiments of the present disclosure further provide a security defending method, and the security defending method is based on the coprocessor or the processing apparatus according to at least one of the above-mentioned embodiments.

For example, in the processing apparatus according to at least one embodiment of the present disclosure, when compiling a program or loading and running a program, a source code or an executable code of the program is parsed, a code that needs to call a function to assign a value to the return address ra is located, a jump destination encryption instruction that encrypts the return address value ra is inserted previous to the code that assigns a value to the return address value (the jump destination address value) ra, so that in a case where a process or a thread corresponding to the program runs here, the coprocessor is called to encrypt the return address value and store the return address value in the encrypted return address value of the corresponding storage address; then, a posterior code that uses the return address value ra is located, and a jump destination authentication instruction that decrypts the encrypted return address value ra is inserted previous to the code that uses the jump destination address value ra, so that in a case where the program runs here, the encrypted return address value is acquired from the corresponding storage address, and then the coprocessor is called to authenticate the encrypted return address value, and the required return address value ra is acquired from the coprocessor in a case where the authentication succeeds.

For example, in the processing apparatus according to at least one embodiment of the present disclosure, when compiling a program or loading and running a program, a source code or an executable code of the program is parsed, a code that creates a function pointer and assigns a function pointer value (the jump destination address value) to the function pointer fp is located, and a jump destination encryption instruction that encrypts the function pointer value is inserted previous to the code that assigns a value to the function pointer fp, so that in a case where the process or the thread corresponding to the program runs here, the coprocessor is called to encrypt the generated function pointer value, and the encrypted function pointer value is store in a corresponding storage address; then, a code that uses the function pointer value fp is located, and a jump destination authentication instruction that decrypts the encrypted function pointer value is inserted previous to the code that uses the function pointer value fp, so that in a case where the program runs here, the encrypted function pointer value is obtained from the corresponding storage address, and then the coprocessor is called to authenticate the encrypted function pointer value, and the required function pointer value fp is acquired from the coprocessor in a case where the authentication succeeds.

For example, in the processing apparatus according to at least one embodiment of the present disclosure, when compiling a program or loading and running a program, a source code or an executable code of the program is parsed, a key reference value loading instruction is inserted at the beginning location of the program, so that in a case where the process or the thread corresponding to the program runs here, the key reference value loading instruction is executed, to load the key reference value corresponding to the program into the key register of the coprocessor. Or, in a case where the process corresponding to the operation task starts or cuts out and then cuts in, the key reference value loading instruction is run, so that the program loads the key reference value corresponding to the program into the key register of the coprocessor. For example, when starting to run a program, the key reference value loading instruction is executed to complete an initialization procedure.

For example, when the key reference value is obtained by calling a key reference value generator (e.g., the random number generator) in the system run by the main processor, the key reference value corresponding to the program is generated before the main processor executing the key reference value loading instruction, stores the reference value in a certain register R1, and modifies the rs1 register in the key reference value loading instruction to pointing to register R1, and then sends the key reference value loading instruction to the coprocessor for processing; and the coprocessor may read the value of register R1. When the key reference value is generated in the coprocessor, the rs1 register in the key reference value loading instruction may be invalidated, and then the key reference value loading instruction is sent to the coprocessor for processing, so that the coprocessor does not need to read the value from the main processor side.

For example, in the processing apparatus according to at least one embodiment of the present disclosure, when loading and running a program, and when the process corresponding to the program cut outs or ends, the system may execute the key reference value storage instruction, read the key reference value corresponding to the program from the key register of the coprocessor and store the same outside the coprocessor, for example, store in the process control block of the processor; or, when the program is ended, the key reference value storage instruction is not executed, and later the key reference value corresponding to the subsequent program is overwritten with the value of the key register of the coprocessor.

For example, in the processing apparatus according to at least one embodiment of the present disclosure, when compiling a program, or loading and running a program, a source code or an executable code of the program is parsed, a mask configuration instruction is inserted at the beginning location of the program, so that when the program runs here, the mask configuration is loaded into the mask register of the coprocessor. Or, when the operating system running on the main processor starts, the mask configuration instruction is run, so that when the program runs here, the mask configuration is loaded into the mask register of the coprocessor.

For example, in the processing apparatus according to at least one embodiment of the present disclosure, when compiling a program or running a program, a source code or an executable code of the program is parsed, for example, a reference address configuration instruction is inserted at the beginning location of the program, so that when the process or the thread corresponding to the program runs here, the reference address is loaded into the reference address register of the coprocessor. Or, when the process corresponding to the program starts or cuts out and then cuts in, the reference address configuration instruction is run, so that when the process or the thread corresponding to the program runs here, the reference address is loaded into the reference address register of the coprocessor. As described above, the reference address may only include useless high-order bits of the base address of the virtual address or the physical address used by the system, or include a portion or the whole of the base address when there are no useless high-order bits, or include useless high-order bits and some effective high-order bits of the base address.

The security defending method according to at least one embodiment of the present disclosure is illustrated, for example, the method according to this embodiment is executed by the coprocessor.

Firstly, an example of the encryption operation section is illustrated.

According to an embodiment of the present disclosure, the coprocessor receives a jump destination encryption request for an operation task (e.g., a process or a thread) of a program running on the main processor; the jump destination encryption request is sent from the main processor to the coprocessor in a form of jump destination encryption instruction, wherein the jump destination encryption request includes information for acquiring a first jump destination storage address and a first jump destination address value corresponding to the program. For example, the first jump destination storage address and the first jump destination address value are respectively the storage address (the return address) of the return address value and the return address value when the process or the thread corresponding to the program calls the function, or the storage address (the pointer address) of the created function pointer value and the function pointer value.

Mask configuration is used to perform first mask processing on the first jump destination address value, and data bits that conform to the first mode from the first jump destination address value are removed, to obtain a first intermediate jump destination address value.

An authentication operation is performed based on the first jump destination storage address, the key reference value corresponding to the operation task and the first intermediate jump destination address value, to obtain a first encryption result value. For example, the key reference value is stored in the key reference value register in the coprocessor; in a case of a thread, the key reference value corresponding to the thread is identical to the key reference value of the process which the thread is subordinate to.

Mask configuration is used to perform second mask processing on the first encryption result value, and data bits that conform to the first mode in the first encryption result value are reserved, to obtain a first intermediate encryption result value.

An authentication operation is performed on the first intermediate encryption result value and the jump destination address value, to obtain a first encryption jump destination address value, and the first encryption jump destination address value is returned, for example, as a response to the jump destination encryption request.

For example, the performing the authentication operation based on the first jump destination storage address, the key reference value corresponding to the operation task, and the first intermediate jump destination address value, to obtain the first encryption result value, includes situations below:

For example, the first jump destination storage address and the key reference value corresponding to the operation task are used to obtain a first key, and then an authentication operation is performed on the first jump destination storage address based on the first key, to obtain the first encryption result value; or, the first jump destination storage address and the first intermediate jump destination address value are used to obtain a first intermediate calculation result value, and then the authentication operation is performed on the first intermediate calculation result value based on the key reference value corresponding to the operation task, to obtain a first encryption result value.

Secondly, an example of the authentication (decryption) operation section is illustrated.

According to an example of the above-described embodiment of the present disclosure, the coprocessor receives a jump destination authentication request for an operation task (e.g., a process or a thread) of a program running on the main processor; the jump destination authentication request is sent to the coprocessor in a form of jump destination authentication instruction from the main processor, wherein the jump destination authentication request includes information for acquiring a second jump destination storage address and a second jump destination address value corresponding to a given program. The second jump destination address value here is an encryption jump destination address value.

Mask configuration is used to perform first mask processing on the second jump destination address value, and data bits that conform to the first mode from the second jump destination address value are removed, to obtain a second intermediate jump destination address value.

An authentication operation is performed based on the second jump destination storage address, the key reference value corresponding to the operation task and the second intermediate jump destination address value, to obtain a second encryption result value. Similarly, for example, the key reference value is stored in the key reference value register in the coprocessor; in a case of a thread, the key reference value corresponding to the thread is identical to the key reference value of the process which the thread is subordinate to.

Mask configuration is used to perform second mask processing on the second encryption result value, and data bits that conform to the first mode in the second encryption result value are remained, to obtain a second intermediate encryption result value.

An authentication operation is performed on the second intermediate encryption result value and a pre-stored reference address corresponding to the operation task that conforms to the first mode, to obtain a third encryption intermediate result value.

Mask configuration is used to perform third mask processing on the second jump destination address value, and data bits that conform to the first mode in the second jump destination address value are remained, to obtain a fourth encryption intermediate result value.

The third encryption intermediate result value is compared with the fourth encryption intermediate result value, wherein a comparison result is used to determine whether the authentication succeeds or not.

For example, the performing the authentication operation based on the second jump destination storage address, the key reference value corresponding to the operation task and the second intermediate jump destination address value, to obtain the second encryption result value, includes situations below:

The second jump destination storage address and the key reference value corresponding to the operation task are used to obtain a second key, and then the authentication operation is performed on the second intermediate jump destination address value based on the second key, to obtain the second encryption result value; or, the second jump destination storage address and the second intermediate jump destination address value are used to obtain a second intermediate calculation result value, and then the authentication operation is performed on the second intermediate calculation result value, based on the key reference value corresponding to the operation task, to obtain the second encryption result value.

According to an example of the above-described embodiment of the present disclosure, in addition to the above-mentioned encryption procedure and the authentication (decryption) procedure, for example, the above-mentioned security defending method further includes: acquiring a key reference value. For example, the acquiring a key reference value includes: receiving the key reference value loading instruction in a case where a process corresponding to the program starts or cuts in on a main processor; obtaining the key reference value from outside the coprocessor or generating the key reference value within the coprocessor, according to the key reference value loading instruction, and storing the key reference value.

According to an example of the above-mentioned embodiment of the present disclosure, for example, the above-mentioned security defending method further includes: taking out the key reference value and saving the key reference value outside the coprocessor. The taking out the key reference value and saving the key reference value outside the coprocessor, includes: receiving the key reference value storage instruction in a case where the process corresponding to the operation task is cut out on the main processor; saving the key reference value stored by the coprocessor outside the coprocessor according to the key reference value storage instruction.

According to an example of the above-mentioned embodiment of the present disclosure, for example, the above-mentioned security defending method further includes: receiving the mask configuration and saving the mask configuration within the coprocessor. The receiving the mask configuration and saving the mask configuration within the coprocessor, includes: receiving a mask configuration instruction in a case where the process corresponding to the program starts on the main processor; and saving the mask configuration within the coprocessor according to the mask configuration instruction.

According to an example of the above-mentioned embodiment of the present disclosure, for example, the above-mentioned security defending method further includes: saving the reference address corresponding to the operation task that conforms to the first mode. The saving the reference address corresponding to the operation task of the program, includes: receiving the reference address configuration instruction before performing the authentication operation; and saving the reference address corresponding to the operation task that conforms to the first mode within the coprocessor. For example, the first mode is high-order data bits of the first number of, and the reference address is a base address of the high-order data bits of the first number.

According to an example of the above-mentioned embodiment of the present disclosure, for example, in the above-mentioned security defending method, the authentication operation includes a symmetric encryption operation or a Message Authentication Code (MAC) algorithm, for example, the symmetric encryption operation includes the DES encryption operation, and the message authentication code algorithm includes the Hash-based Message Authentication Code (HMAC) algorithm.

According to an example of the above-mentioned embodiment of the present disclosure, for example, in the above-mentioned security defending method, the authentication operation includes an XOR operation.

According to an example of the above-mentioned embodiment of the present disclosure, for example, in the above-mentioned security defending method, the first jump destination storage address is a program return address or a function pointer address, and the first jump destination address value is a program return address value or a function pointer address value.

According to an example of the above-mentioned embodiment of the present disclosure, for example, in the above-mentioned security defending method, return a standby jump destination address value that has been decrypted corresponding to the program, based on the second intermediate jump destination address value, in response to the authentication succeeding.

According to an example of the above-mentioned embodiment of the present disclosure, for example, in the above-mentioned security defending method, the returning the standby jump destination address value corresponding to the program based on the second intermediate jump destination address value, includes: obtaining the standby jump destination address value in combination with the second intermediate jump destination address value and the reference address, in response to the reference address being the base address corresponding to the program.

Figure 4A:
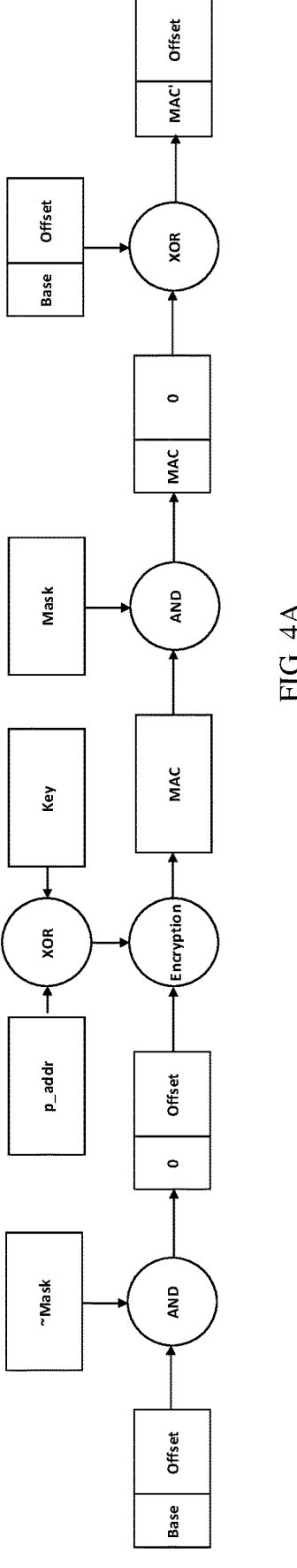
FIG. 4A shows an example of an encryption operation in a security defending method according to at least one embodiment of the present disclosure.

According to the above-mentioned embodiments of the present disclosure, for example, taking that the first jump destination storage address and the first jump destination address value are respectively the storage address (the pointer address) of the created function pointer value and the function pointer value as an example, and taking that the first mode of the mask configuration corresponds to all base addresses in the addresses to be processed as an example, referring to FIG. 4A, an example of the encryption operation in the above-mentioned security defending method is illustrated.

As shown in FIG. 4A, the function pointer value (the address value) includes a base address (Base) and an offset value (Offset). The first mode of the mask configuration is that a width of the mask (Mask) being identical to a width of the function pointer value, a portion corresponding to the base address being 1 and a portion corresponding to the offset value being 0. After receiving the jump destination encryption instruction, the coprocessor acquires the function pointer value through the source register rs1 recorded in the instruction, acquires the function pointer address (p_addr) through the source register rs2 recorded in the instruction, acquires the saved mask (Mask) configuration from the mask register, and acquires the saved key reference value (Key) from the key reference value register.

The mask (Mask) is reversed to obtain a new mask (~Mask); a mask operation (which is an AND operation here) is performed on the function pointer value and the reversed mask (~Mask), to obtain a first intermediate value. As compared with the input function pointer value, the first intermediate value has the base address (Base) portion removed (i.e., the base address portion is zeroed) but only the offset value (Offset) portion reserved. An XOR operation, for example, is performed on the function pointer address and the key reference value, to obtain a key. An authentication operation is performed on the key and the first intermediate value (e.g., a plaintext) by the authenticating circuit, to obtain a second intermediate value. The second intermediate value is a ciphertext (MAC). An AND operation is performed on the second intermediate value and the mask (Mask), to obtain a third intermediate value. As compared with the second intermediate value, the third intermediate value has a portion corresponding to the offset value removed, that is, only has the high-order bit portion corresponding to the base address in the obtained ciphertext reserved. An XOR operation is performed on the third intermediate value and the input function pointer value, to obtain an encrypted function pointer value, and the encrypted function pointer value includes the authentication value (MAC') portion obtained through encryption and authentication operations corresponding to the high-order bit portion of the base address, and includes the offset value in the original function pointer value.

Figure 4B:
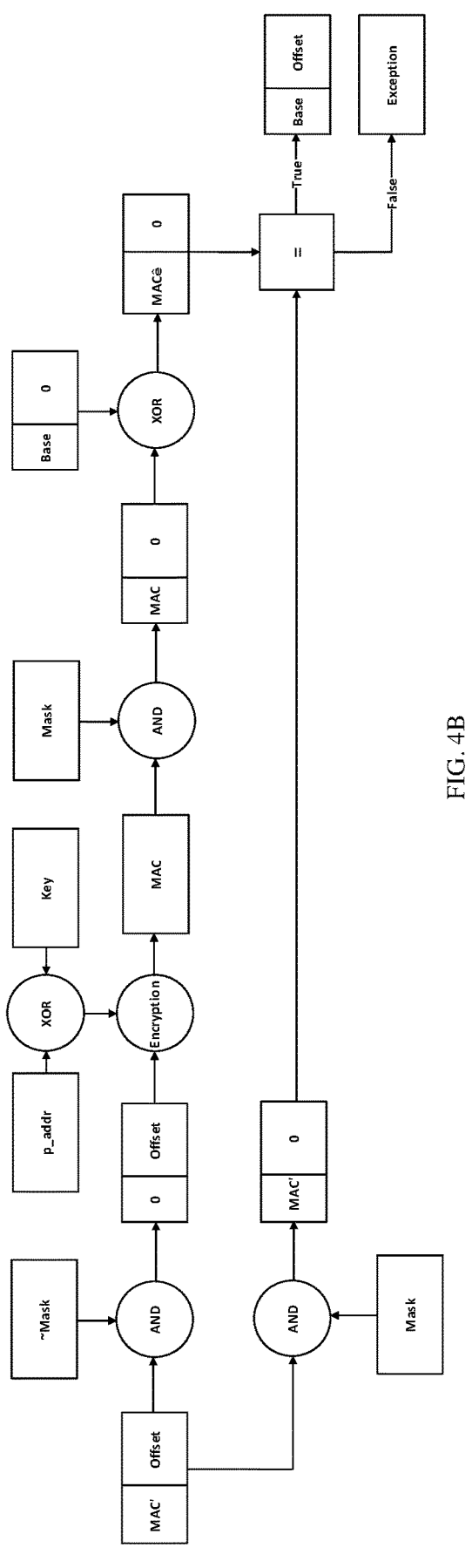
FIG. 4B shows an example of an authentication/decryption operation in a security defending method according to at least one embodiment of the present disclosure.

According to the above-mentioned embodiments of the present disclosure, for example, taking that the first jump destination storage address and the first jump destination address value are respectively the storage address (the pointer address) of the created function pointer value and the function pointer value as an example, and taking that the first mode of the mask configuration corresponds to all base addresses in the addresses to be processed as an example, referring to FIG. 4B, an example of the authentication/decryption operation in the above-mentioned security defending method is illustrated.

As shown in FIG. 4B, similarly, the function pointer value (the address value) includes a base address (Base) and an offset value (Offset), and the first mode of the mask configuration is that a width of the mask (Mask) is identical to a width of the function pointer value, a portion corresponding to the base address being 1 and a portion corresponding to the offset value being 0. The encrypted function pointer value includes the authentication value (MAC') portion obtained by encryption and authentication operations corresponding to the high-order bit portion of the base address and the offset value (Offset) in the original function pointer value. After receiving the jump destination authentication instruction, the coprocessor acquires the encrypted function pointer value through the source register rs1 recorded in the instruction, acquires the function pointer address (p_addr) through the source register rs2 recorded in the instruction, acquires the saved mask (Mask) configuration from the mask register, acquires the saved key reference value (Key) from the key reference value register, and acquires the saved base address (Base) that is taken as the reference address from the reference address register.

The mask (Mask) is reversed to obtain a new mask (~Mask), an AND operation is performed on the encrypted function pointer value and the reversed mask (~Mask), to obtain a first intermediate value. As compared with the encrypted function pointer value input, the first intermediate value has the authentication value (MAC') portion removed and has only the offset value (Offset) portion reserved. An XOR operation is performed on the function pointer address and the key reference value, to obtain a key. An authentication operation is performed on the key and the first intermediate value by the authenticating circuit, to obtain a second intermediate value; the second intermediate value is a ciphertext (MAC). An AND operation is performed on the second intermediate value and the mask (Mask), to obtain a third intermediate value. As compared with the second intermediate value, the third intermediate value has a portion corresponding to the offset value removed, that is, only has the high-order bit portion corresponding to the base address in the obtained ciphertext reserved. An XOR operation is performed on the third intermediate value and the base address, to obtain a fourth intermediate value. The fourth intermediate value is a calculated authentication value (MAC") in the high-order bit portion corresponding to the base address; the calculated authentication value (MAC") is compared with the authentication value (MAC') in the encrypted function pointer value. If the two are identical, the authentication succeeds, otherwise, exception (Interrupt) is triggered, that is, the (encrypted) function pointer value used for authentication has been modified, and is no longer the encrypted function pointer value returned during encryption.

In a case where the authentication succeeds, the base address and the offset value in the encrypted function pointer value input are combined, to obtain the decrypted function pointer value, that is, the base address and the first intermediate value are combined, to obtain the decrypted function pointer value, and the decrypted function pointer is returned to the main processor (i.e., written into the destination register rd).

In order to perform the above-mentioned comparison, firstly, an AND operation may be performed on the encrypted function pointer value and the mask (Mask), to obtain a fifth intermediate value. As compared with the encrypted function pointer value input, the fifth intermediate value has the offset value removed and only the input authentication value (MAC') reserved. By comparing the fourth intermediate value with the fifth intermediate value, comparison between the calculated authentication value (MAC") and the input authentication value (MAC') is implemented.

Figure 4C:
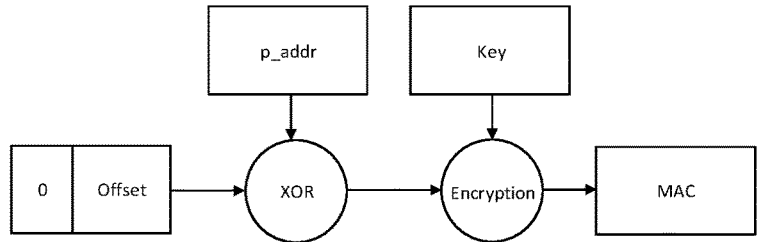
FIG. 4C shows a variant example of the authentication/decryption operation in the security defending method according to at least one embodiment of the present disclosure relative to FIG. 4A and FIG. 4B.

FIG. 4C shows a variant of the examples shown in FIG. 4A and FIG. 4B, which differs from the examples shown in FIG. 4A and FIG. 4B in that, input of the authentication operation for obtaining the authentication value is different. As shown in FIG. 4C, after a mask operation (an AND operation) is performed on the function pointer value and the reversed mask (~Mask) to obtain the first intermediate value, an XOR operation, for example, is performed on the first intermediate value and the function pointer address (p_addr), to obtain a first intermediate result value. The key reference value is used as a key and an authentication operation is performed on the first intermediate result value by the authenticating circuit, to obtain a second intermediate value, and the second intermediate value is, for example, a ciphertext (MAC). The rest of the variant example is the same as the examples shown in FIG. 4A and FIG. 4B, and no details will be repeated here.

Some embodiments of the present disclosure further provide a coprocessor, configured to implement the above-mentioned security defending method.

According to at least one embodiment of the present disclosure, for example, referring to FIG. 1, the provided coprocessor is configured for security defense of a program, including a decoder, a key register, an authenticating circuit, and a control circuit.

The decoder is configured to decode an operation instruction input to the coprocessor, wherein the operation instruction includes a jump destination encryption instruction, and the jump destination encryption instruction includes information for acquiring a first jump destination storage address and a first jump destination address value corresponding to an operation task.

The key register is configured to store a key reference value corresponding to the operation task.

The control circuit is configured to use the mask configuration to perform first mask processing on the first jump destination address value, and remove data bits that conform to the first mode from the first jump destination address value, to obtain a first intermediate jump destination address value.

The authenticating circuit is configured to perform an authentication operation based on the first jump destination storage address, the key reference value corresponding to the operation task, and the first intermediate jump destination address value, to obtain a first encryption result value.

Correspondingly, the control circuit is further configured to use the mask configuration, to perform second mask processing on the first encryption result value, and reserve data bits that conform to the first mode in the first encryption result value, to obtain a first intermediate encryption result value; and perform the authentication operation on the first intermediate encryption result value and the jump destination address value, to obtain a first encryption jump destination address value, and return the first encryption jump destination address value, for example, as a response to the jump destination encryption request.

For example, the performing an authentication operation based on the first jump destination storage address, the key reference value corresponding to the operation task, and the first intermediate jump destination address value, to obtain the first encryption result value, includes situations below:

For example, the first jump destination storage address and the key reference value corresponding to the operation task are used to obtain a first key, and then the authentication operation is performed on the first intermediate jump destination address value based on the first key, to obtain the first encryption result value; or, for example, the first jump destination storage address and the first intermediate jump destination address value are used to obtain a first intermediate calculation result value, and then the authentication operation is performed on the first intermediate calculation result value based on the key reference value corresponding to the operation task, to obtain a first encryption result value.

According to an example of the above-mentioned embodiment of the present disclosure, for example, the coprocessor further includes a reference address register, wherein the reference address register is configured to store a base address corresponding to an operation task.

The operation instruction further includes a jump destination authentication instruction, the jump destination authentication instruction includes information for obtaining the second jump destination storage address and the second jump destination address value corresponding to the program, accordingly, the control circuit is further configured to use the mask configuration to perform first mask processing on the second jump destination address value, and remove data bits that conform to the first mode from the second jump destination address value, to obtain a second intermediate jump destination address value. The authenticating circuit is further configured to perform an authentication operation based on the second jump destination storage address, the key reference value corresponding to the operation task and the second intermediate jump destination address value, to obtain a second encryption result value. Correspondingly, the control circuit is further configured to use mask configuration, to perform second mask processing on the second encryption result value, and reserve data bits that conform to the first mode in the second encryption result value, to obtain a second intermediate encryption result value; perform a authentication operation on the second intermediate encryption result value and the pre-stored reference address corresponding to the operation task that conforms to the first mode, to obtain a third encryption intermediate result value; use mask configuration, to perform third mask processing on the second jump destination address value, and reserve data bits that conform to the first mode in the second jump destination address value, to obtain a fourth encryption intermediate result value; and compare the third encryption intermediate result value with the fourth encryption intermediate result value, wherein a comparison result is used to determine whether the authentication succeeds or not.

The performing an authentication operation based on the second jump destination storage address, the key reference value corresponding to the operation task and the second intermediate jump destination address value, to obtain a second encryption result value, includes situations below:

For example, the second jump destination storage address and the key reference value corresponding to the operation task are used to obtain a second key, and then an authentication operation is performed on the second intermediate jump destination address value based on the second key, to obtain a second encryption result value; or, for example, the second jump destination storage address and the second intermediate jump destination address value are used to obtain a second intermediate calculation result value, and then an authentication operation is performed on the second intermediate calculation result value, based on the key reference value corresponding to the operation task, to obtain a second encryption result value.

According to an example of the above-mentioned embodiment of the present disclosure, for example, the operation instruction further includes a reference address configuration instruction; and correspondingly, the control circuit is further configured to save the reference address corresponding to the operation task that conforms to the first mode within the coprocessor.

According to an example of the above-mentioned embodiment of the present disclosure, for example, the first mode is high-order data bits of the first number, and the reference address is a base address of high-order data bits of the first number.

According to an example of the above-mentioned embodiment of the present disclosure, for example, the coprocessor further includes a mask register, wherein the mask register is configured to store mask configuration.

According to an example of the above-mentioned embodiment of the present disclosure, for example, the operation instruction further includes a mask configuration instruction; and correspondingly, the control circuit is further configured to obtain mask configuration according to the mask configuration instruction and store the mask configuration in the mask register.

According to an example of the above-mentioned embodiment of the present disclosure, for example, the operation instruction further includes a key reference value loading instruction; and correspondingly, the control circuit is further configured to obtain the key reference value from outside the coprocessor or generate the key reference value within the coprocessor, according to the key reference value loading instruction, and store the key reference value in the key reference value register.

According to an example of the above-mentioned embodiment of the present disclosure, for example, the coprocessor further includes a random number generator, and the random number generator is configured to generate the key reference value within the coprocessor, and then save the key reference value in the key register.

According to an example of the above-mentioned embodiment of the present disclosure, for example, the operation instruction further includes a key reference value storage instruction, and correspondingly, the control circuit is further configured to save the key reference value stored by the coprocessor outside the coprocessor according to the key reference value storage instruction.

According to an example of the above-mentioned embodiment of the present disclosure, for example, the control circuit is further configured to return a standby jump destination address value corresponding to the program based on the second intermediate jump destination address value, in response to the authentication succeeding.

According to an example of the above-mentioned embodiment of the present disclosure, for example, the control circuit is further configured to obtain the jump destination address value to be used in combination with the second intermediate jump destination address value and the reference address, in response to the reference address being the base address corresponding to the program.

According to an example of the above-mentioned embodiment of the present disclosure, for example, the authenticating circuit is a DES authenticating circuit or a message authenticating circuit.

Figure 5:
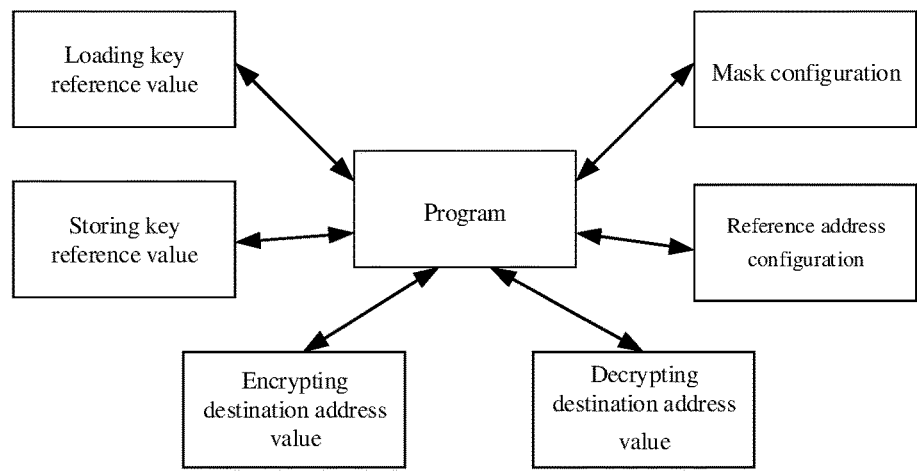
FIG. 5 shows a block diagram of a security defending method executed on a main processor according to at least one embodiment of the present disclosure.

Next, the security defending method according to at least one embodiment of the present disclosure will be illustrated, for example, the method according to this embodiment is executed by the main processor. FIG. 5 shows a block diagram of a security defending method executed on a main processor according to at least one embodiment of the present disclosure. As shown in FIG. 5, when a program is running, operations such as key reference value loading, key reference value storing, mask configuration, reference address configuration, destination address value encryption and destination address value decryption, etc., will be executed as required. Specific examples are described below.

According to an embodiment of the present disclosure, the main processor runs a program, and in a running procedure of the program, sends a mask configuration instruction to the coprocessor to save mask configuration in a mask register of the coprocessor, wherein the mask configuration is used for the coprocessor to perform mask processing on a received destination address value in an encryption procedure or an authentication procedure; and sends a reference address configuration instruction corresponding to the program to the coprocessor, so as to save a reference address in a reference address register of a coprocessor, wherein the reference address is used for the coprocessor to obtain a decrypted jump destination address value to be used corresponding to the program in the authentication procedure.

According to an example of the above-mentioned embodiment of the present disclosure, for example, the security defending method further includes: sending a key reference value loading instruction to the coprocessor, in a case where a process corresponding to the operation task starts or cuts in on the main processor, to save a key reference value in a key reference value register of the coprocessor, wherein the key reference value is used for the coprocessor to generate a key in an encryption procedure or an authentication procedure.

According to an example of the above-mentioned embodiments of the present disclosure, for example, the key reference value loading instruction includes a source register in the main processor that saves the key reference value, so that the coprocessor reads the key reference value from the source register, or the key reference value loading instruction instructs the coprocessor to generate the key reference value.

According to an example of the above-mentioned embodiment of the present disclosure, for example, the security defending method further includes: generating the key reference value in the main processor and saving the key reference value in the source register.

According to an example of the above-mentioned embodiment of the present disclosure, for example, the key reference value is a random number.

According to an example of the above-mentioned embodiment of the present disclosure, for example, the security defending method further includes: sending a key reference value storage instruction to the coprocessor, in a case where the process corresponding to the operation task is cut out on the main processor; and receiving and saving the key reference value returned by the coprocessor according to the key reference value storage instruction.

According to an example of the above-mentioned embodiment of the present disclosure, for example, the key reference value is saved in a Process Control Block (PCB) corresponding to the operation task.

According to an example of the above-mentioned embodiment of the present disclosure, for example, the reference address conforms to a first mode defined by the mask configuration.

According to an example of the above-mentioned embodiment of the present disclosure, for example, the first mode is high-order data bits of a first number of, and the reference address is a base address of the high-order data bits for the first number.

According to an example of the above-mentioned embodiment of the present disclosure, for example, the security defending method further includes: sending a jump destination encryption instruction to the coprocessor, wherein the jump destination encryption instruction includes information for acquiring a first jump destination storage address and a first jump destination address value corresponding to the program, and the coprocessor performs an encryption operation according to the mask configuration, the first jump destination storage address and the first jump destination address value to obtain a first encryption jump destination address value; and receiving the first encryption jump destination address value from the coprocessor.

According to an example of the above-mentioned embodiment of the present disclosure, for example, the first jump destination storage address is a program return address or a function pointer address, and the first jump destination address value is a program return address value or a function pointer address value.

According to an example of the above-mentioned embodiment of the present disclosure, for example, the security defending method further includes: sending a jump destination authentication instruction to the coprocessor, wherein the jump destination authentication instruction includes information for acquiring a second jump destination storage address and a second jump destination address value corresponding to the program, the second jump destination address value is an jump destination address value that has been encrypted, and the coprocessor performs an authentication operation according to the mask configuration, the second jump destination storage address and the second jump destination address value; and receiving a standby jump destination address value that has been decrypted corresponding to the program, in response to the authentication succeeding; or, receiving exception information from the coprocessor, in response to the authentication failing, wherein the coprocessor obtains the standby jump destination address value according to the reference address and the second jump destination address value.

In the security defending method according to at least some embodiments of the present disclosure, the mechanism for encrypting the return destination address value includes: encrypting and storing the return destination address value (e.g., the return address ra, the function pointer fp, etc.) in combination with the return destination storage address (addr) and the key reference value corresponding to the process, to obtain a ciphertext; and determining at which bits the authentication value (MAC) is placed in the encrypted destination address value, according to the mask configuration (Mask) stored in the coprocessor. In a running procedure of the program, when it is necessary to use the return destination address value, an authentication instruction is used to instruct the coprocessor to decrypt, so as to defend against possible attacks by comparing whether the authentication value (MAC) has changed or not. The decrypted destination address value to be used obtained after the authentication succeeds is loaded into the register of the main processor, and is caused to point to a correct destination address, so as to implement the decryption/authentication procedure of the destination address value. Through the above-mentioned mechanism, the return destination address value may be encrypted and hidden, so, even if an attacker changes a direction of a control flow of the program through various attack means, a location which the finally decrypted destination address value to be used points to cannot be actually changed, so that a location of an attack code cannot be located. Therefore, the embodiments of the present disclosure may prevent buffer overflow attacks.

Some embodiments of the present disclosure further provide a processing apparatus, referring to the block diagram of FIG. 1, the processing apparatus includes any one of the above-mentioned coprocessors and a main processor, wherein the main processor is configured to run a program, generate an operation task, and send an operation instruction to the coprocessor; and the coprocessor is configured to execute the above-mentioned security defending method used in the operation task.

Some embodiments of the present disclosure further provide an electronic apparatus; and the electronic apparatus includes a main processor, a coprocessor, and a memory, wherein the memory stores a computer executable code; and the computer executable code, when executed by the main processor and the coprocessor, is configured to implement the above-mentioned security defending method.

In the above-mentioned embodiment, the main processor and the coprocessor communicate with each other through a communication interface. For example, the main processor is a RISC-V processor; and the communication interface is a RoCC interface.

Figure 6:
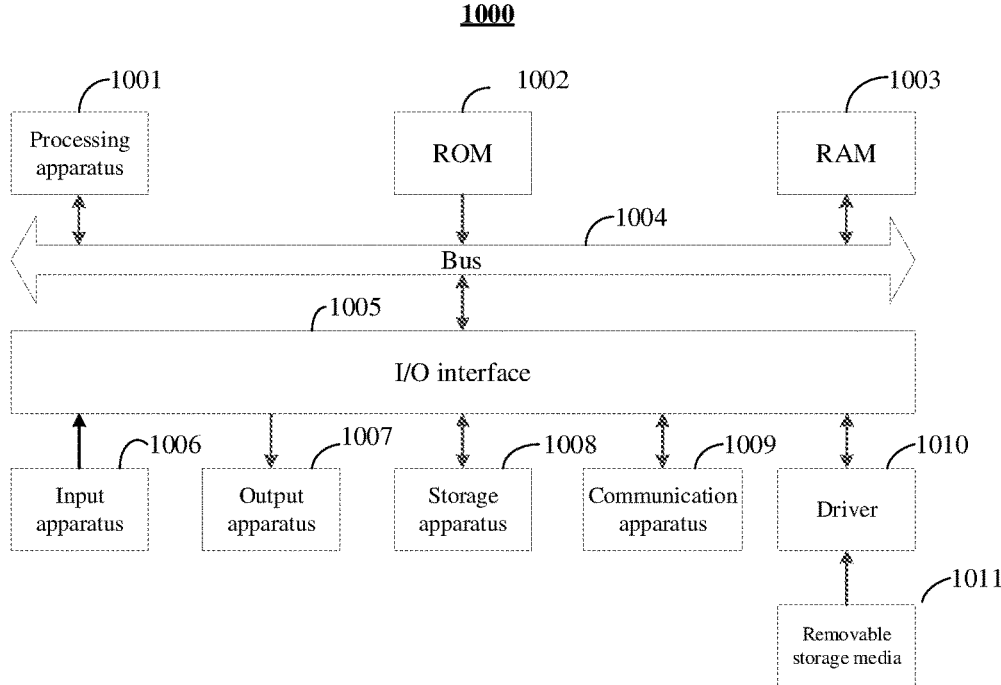
FIG. 6 is a schematic block diagram of an electronic apparatus provided by at least one embodiment of the present disclosure.

FIG. 6 is a schematic block diagram of an electronic apparatus provided by at least one embodiment of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device 1000 illustrated in FIG. 6 is merely an example, and should not pose any limitation to the functions and the range of use of the embodiments of the present disclosure.

For example, as illustrated in FIG. 6, in some examples, the electronic device 1000 includes a processing apparatus, which may include a processing apparatus of any of the above-mentioned embodiments, which can perform various suitable actions and processing according to a program stored in a read-only memory (ROM) 1002 or a program loaded from a storage apparatus 1008 into a random access memory (RAM) 1003. The RAM 1003 further stores various programs and data required for operations of the electronic device 1000. The processing apparatus 1001, the ROM 1002, and the RAM 1003 are interconnected by means of a bus 1004. An input/output (I/O) interface 1005 is also connected to the bus 1004.

For example, the following apparatus may be connected to the I/O interface 1005: an input apparatus 1006 including, for example, a touch screen, a touch pad, a keyboard, a mouse, a camera, a microphone, an accelerometer, a gyroscope, or the like; an output apparatus 1007 including, for example, a liquid crystal display (LCD), a loudspeaker, a vibrator, or the like; a storage apparatus 1008 including, for example, a magnetic tape, a hard disk, or the like; a communication apparatus 1009 including a network interface card such as a LAN card, a modem, etc. The communication apparatus 1009 may allow the electronic apparatus 1000 to perform wireless or wired communication with other device so as to exchange data, and perform communication processing via a network such as the Internet. The driver 1010 is also coupled to an I/O interface 1005 as required. Removable storage media 1011, such as a magnetic disk, an optical disk, a magneto-optical disk, a semiconductor memory, etc. are installed on the driver 1010 as required, so that computer programs read therefrom may be installed into a storage apparatus 1008 as required. Although FIG. 6 shows an electronic apparatus 1000 including various apparatuses, it should be understood that, it is not required to implement or have all the apparatuses shown, and the electronic apparatus 1000 may alternatively implement or have more or fewer apparatuses.

For example, the electronic apparatus 1000 may further include a peripheral interface (not shown), etc. The peripheral interface may be interfaces of various types, for example, a USB interface, a lighting interface, etc. The communication apparatus 1009 may communicate with a network and other devices through wireless communication, the network is, for example, the Internet, an intranet and/or a wireless network such as a cellular telephone network, a wireless Local Area Network (LAN) and/or a Metropolitan Area Network (MAN). Wireless communication may adopt any one of a variety of communication standards, protocols and technologies, including but not limited to Global System for Mobile communication (GSM), Enhanced Data GSM Environment (EDGE), Wideband Code Division Multiple Access (W-CDMA), Code Division Multiple Access (CDMA), Time Division Multiple Access (TDMA), Bluetooth, Wi-Fi (e.g., based on IEEE 802.11a, IEEE 802.11b, IEEE 802.11g and/or IEEE 802.11n standards), Voice over Internet Protocol (VoIP), Wi-MAX, protocols for e-mail, instant messaging and/or Short Message Service (SMS), or any other suitable communication protocol.

For example, the electronic apparatus 1000 may be a mobile phone, a tablet personal computer, a laptop, an e-book, a game console, a television, a digital photo frame, a navigator, a household appliance, a communication base station, an industrial controller, a server, or any combination of data processing apparatuses and hardware, which will not be limited in the embodiments of the present disclosure.

For the present disclosure, the following statements should be noted:

(1) The drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only exemplary embodiments of the present disclosure, and are not intended to limit the protection scope of the present disclosure, and the protection scope of the present disclosure is determined by the appended claims.

What is claimed is:

1. A security defending method of an operation task, applicable in a main processor running the operation task, comprising:

sending a mask configuration instruction from the main processor to a coprocessor, wherein the mask configuration instruction is used to instruct the coprocessor to save mask configuration in a mask register of the coprocessor, wherein the mask configuration is used for the coprocessor to perform mask processing on a received destination address value in an encryption procedure and an authentication procedure; and sending a reference address configuration instruction corresponding to the operation task from the main processor to the coprocessor, wherein the reference address configuration instruction is used to instruct the coprocessor to save a reference address in a reference address register of the coprocessor, wherein the reference address is used for the coprocessor to perform an authentication operation in the authentication procedure, wherein the encryption procedure comprises:

performing, by the coprocessor, mask processing on a first jump destination address value according to the mask configuration to obtain a first intermediate jump destination address value;

performing, by the coprocessor, the authentication operation based on the first intermediate jump destination address value, a key reference value and a first jump destination storage address to obtain a first encryption jump destination address value, wherein the authentication procedure comprises:

performing, by the coprocessor, mask processing on a second jump destination address value according to the mask configuration to obtain a second intermediate jump destination address value;

performing, by the coprocessor, the authentication operation based on the second intermediate jump destination address value, the key reference value and a second jump destination storage address to obtain a second address value;

determining, by the coprocessor, whether an authentication succeeds based on the second address value and the reference address, wherein the authentication operation comprises a symmetric encryption operation or a Message Authentication Code algorithm, wherein the security defending method further comprises:

sending a jump destination encryption instruction to the coprocessor, wherein the jump destination encryption instruction comprises information for acquiring the first jump destination storage address and the first jump destination address value corresponding to the operation task; and receiving the first encryption jump destination address value from the coprocessor.

2. The security defending method according to claim 1, further comprising:

sending a key reference value loading instruction to the coprocessor, in a case where a process corresponding to the operation task starts or cuts in on the main processor, to save the key reference value in a key reference value register of the coprocessor, wherein the key reference value is used for the coprocessor to generate a key in the encryption procedure and the authentication procedure.

3. The security defending method according to claim 2, wherein the key reference value loading instruction comprises a source register saving the key reference value in the main processor, so that the coprocessor reads the key reference value from the source register, or the key reference value loading instruction instructs the coprocessor to generate the key reference value.

4. The security defending method according to claim 3, further comprising:

generating the key reference value in the main processor and saving the key reference value in the source register.

5. The security defending methods according to claim 2, wherein the key reference value is a random number.

6. The security defending method according to claim 2, further comprising:

sending a key reference value storage instruction to the coprocessor, in a case where a process corresponding to the operation task is cut out on the main processor; and receiving and saving the key reference value returned by the coprocessor according to the key reference value storage instruction.

7. The security defending method according to claim 6, wherein the key reference value is saved in a Process Control Block (PCB) corresponding to the operation task in the main processor.

8. The security defending method according to claim 1, wherein the reference address conforms to a first mode defined by the mask configuration.

9. The security defending method according to claim 8, wherein the first mode is high-order data bits of a first number, and the reference address is a base address for high-order data bits of the first number.

10. The security defending method according to claim 1, wherein the first jump destination storage address is an operation task return address or a function pointer address; and the first jump destination address value is an operation task return address value or a function pointer address value.

11. The security defending method according to claim 1, further comprising:

sending a jump destination authentication instruction to the coprocessor, wherein the jump destination authentication instruction comprises information for acquiring the second jump destination storage address and the second jump destination address value corresponding to the operation task, the second jump destination address value is a jump destination address value that has been encrypted, and the coprocessor performs the authentication operation according to the mask configuration, the second jump destination storage address and the second jump destination address value; and

28 receiving a standby jump destination address value that has been decrypted corresponding to the operation task from the coprocessor in response to the authentication succeeding, or, receiving exception information from the coprocessor in response to the authentication failing, wherein the coprocessor obtains the standby jump destination address value according to the reference address and the second jump destination address value.

12. An electronic apparatus, comprising a main processor, a coprocessor in communication with the main processor, and a memory, wherein the memory stores a computer executable code, and the computer executable code, when executed by the main processor and the coprocessor, is configured to implement a security defending method, wherein the security defending method, applicable in a main processor running an operation task, comprises:

sending a mask configuration instruction from the main processor to a coprocessor, wherein the mask reference address configuration instruction is used to instruct the coprocessor to save mask configuration in a mask register of the coprocessor, wherein the mask configuration is used for the coprocessor to perform mask processing on a received destination address value in an encryption procedure and an authentication procedure; and sending a reference address configuration instruction corresponding to the operation task from the main processor to the coprocessor, wherein the reference address configuration instruction is used to instruct the coprocessor to save a reference address in a reference address register of the coprocessor, wherein the reference address is used for the coprocessor to perform an authentication operation in the authentication procedure, wherein the encryption procedure comprises:

performing, by the coprocessor, mask processing on a first jump destination address value according to the mask configuration to obtain a first intermediate jump destination address value;

performing, by the coprocessor, the authentication operation based on the first intermediate jump destination address value, a key reference value and a first jump destination storage address to obtain a first encryption jump destination address value, wherein the authentication procedure comprises:

performing, by the coprocessor, mask processing on a second jump destination address value according to the mask configuration to obtain a second intermediate jump destination address value;

performing, by the coprocessor, the authentication operation based on the second intermediate jump destination address value, the key reference value and a second jump destination storage address to obtain a second address value;

determining, by the coprocessor, whether an authentication succeeds based on the second address value and the reference address, wherein the authentication operation comprises a symmetric encryption operation or a Message Authentication Code algorithm, wherein the security defending method further comprises:

sending a jump destination encryption instruction to the coprocessor, wherein the jump destination encryption instruction comprises information for acquiring the first jump destination storage address and the first jump destination address value corresponding to the operation task; and receiving the first encryption jump destination address value from the coprocessor.

13. The electronic apparatus according to claim 12, wherein the main processor and the coprocessor communicate with each other through a communication interface.

14. The electronic apparatus according to claim 13, wherein the main processor is a RISC-V processor, and the communication interface is a RoCC interface.

\*   \*   \*   \*   \*